(12) United States Patent
Heynssens

(10) Patent No.: US 9,028,195 B1
(45) Date of Patent: May 12, 2015

(54) TELESCOPING CARGO LIFTING APPARATUS FOR A TRUCK

(71) Applicant: Robert P. Heynssens, Gladstone, MI (US)

(72) Inventor: Robert P. Heynssens, Gladstone, MI (US)

( * ) Notice: Subject to any disclaimer, the term of this patent is extended or adjusted under 35 U.S.C. 154(b) by 0 days.

(21) Appl. No.: 14/144,649

(22) Filed: Dec. 31, 2013

(51) Int. Cl.
| B60P 1/00 | (2006.01) |
| B60P 1/44 | (2006.01) |
| B60P 1/43 | (2006.01) |

(52) U.S. Cl.
CPC ............. *B60P 1/4428* (2013.01); *B60P 1/4485* (2013.01); *B60P 1/435* (2013.01); *B60P 1/4421* (2013.01)

(58) Field of Classification Search
CPC ....... A01D 90/083; B60P 1/26; B60P 1/4421; B60P 1/4442; B60P 1/4428; B60P 1/02; B60P 3/40; B60P 1/435; B60P 3/14; B60P 1/022; B65F 3/18; B65F 3/26; B65F 3/205; B65F 3/08; B65F 3/00; B66F 11/04; B66F 7/065; B66F 7/08; A61G 3/062; A61G 3/06; B62D 33/0273; B62D 33/03; B62D 33/037; B62D 33/0276; E05D 15/52; B60J 5/101; E05F 15/127; B60R 9/00; B60R 11/06; B60R 9/042
USPC .................. 414/540, 541, 545, 472; 187/243; 296/57.1, 51, 56, 37.6
See application file for complete search history.

(56) References Cited

U.S. PATENT DOCUMENTS

| 2,277,529 | A | * | 3/1942 | Richter .......................... 414/545 |
| 2,498,161 | A | | 2/1950 | Hamilton et al. |
| 3,024,926 | A | * | 3/1962 | Nolden .......................... 414/545 |
| 3,693,693 | A | | 9/1972 | Court |
| 3,747,782 | A | * | 7/1973 | Brown ........................... 414/545 |
| 3,831,788 | A | * | 8/1974 | Erlinder ........................ 414/545 |
| 3,870,126 | A | * | 3/1975 | Himes ........................... 187/403 |
| 4,007,844 | A | | 2/1977 | Perkins |
| 4,087,007 | A | * | 5/1978 | Drews ........................... 414/545 |
| 4,479,753 | A | * | 10/1984 | Thorley ........................ 414/541 |
| 4,586,684 | A | | 5/1986 | Carter et al. |
| 4,930,969 | A | | 6/1990 | Langer |
| 4,930,971 | A | * | 6/1990 | Wilson ........................... 414/545 |
| 5,176,486 | A | * | 1/1993 | Park .............................. 414/472 |
| 5,263,808 | A | * | 11/1993 | Kent ............................. 414/545 |
| 5,501,503 | A | | 3/1996 | Thayer |
| 5,513,943 | A | * | 5/1996 | Lugash et al. ................ 414/545 |
| 5,540,539 | A | * | 7/1996 | Wolfman et al. ............. 414/541 |

(Continued)

FOREIGN PATENT DOCUMENTS

GB 2188027 A 9/1987

*Primary Examiner* — Saul Rodriguez
*Assistant Examiner* — Glenn Myers
(74) *Attorney, Agent, or Firm* — Quarles & Brady LLp

(57) ABSTRACT

An apparatus for loading and unloading a truck with cargo includes a mounting frame for attaching adjacent to a truck doorway. The mounting frame includes a first guide member forming a first channel, a first support member slideably received within the first channel, a second guide member forming a second channel, and a second support member slideably received within the second channel. A platform for supporting the cargo is pivotally coupled to the first support member and to the second support member. A power driven lift elevator slides the first support member within the first channel and slides the second support member within the second channel to thereby raise and lower the platform. A power driven platform elevator pivots the platform respect to the first and second support members to move the platform between horizontal and vertical positions.

18 Claims, 3 Drawing Sheets

(56) References Cited

U.S. PATENT DOCUMENTS

| | | | |
|---|---|---|---|
| 5,597,282 A * | 1/1997 | Hoffman et al. | 414/545 |
| 6,135,532 A * | 10/2000 | Martin | 296/61 |
| 6,666,643 B1 | 12/2003 | Heynssens | |
| 6,769,858 B1 * | 8/2004 | Butler et al. | 414/462 |
| 7,100,956 B1 * | 9/2006 | Wilkins | 296/37.2 |
| 7,195,106 B2 | 3/2007 | Heynssens | |
| 7,299,897 B2 | 11/2007 | Stockmann | |
| 7,419,204 B2 * | 9/2008 | Coble et al. | 296/57.1 |
| 7,484,921 B2 | 2/2009 | Murphy | |
| 7,491,026 B2 | 2/2009 | Hooker | |
| 7,806,647 B2 | 10/2010 | Gomes et al. | |
| 8,740,539 B2 * | 6/2014 | Ablabutyan | 414/545 |
| 2003/0189353 A1 * | 10/2003 | Moore | 296/37.6 |
| 2007/0020076 A1 | 1/2007 | Heynssens | |
| 2009/0162175 A1 * | 6/2009 | Pearson | 414/545 |
| 2010/0225137 A1 * | 9/2010 | Gunby | 296/57.1 |
| 2012/0121369 A1 * | 5/2012 | Ablabutyan | 414/540 |
| 2013/0136567 A1 * | 5/2013 | Hambardzumyan | 414/540 |
| 2013/0189062 A1 | 7/2013 | Bark et al. | |

\* cited by examiner

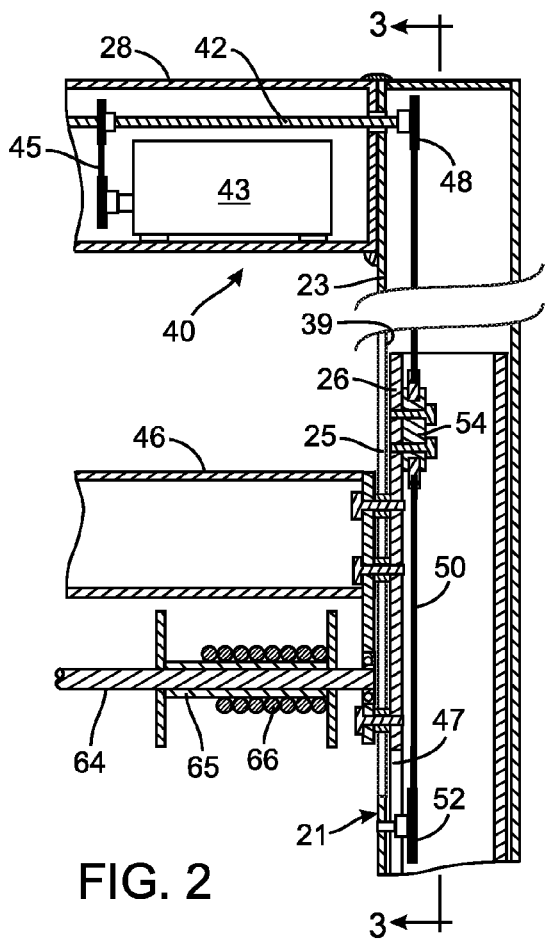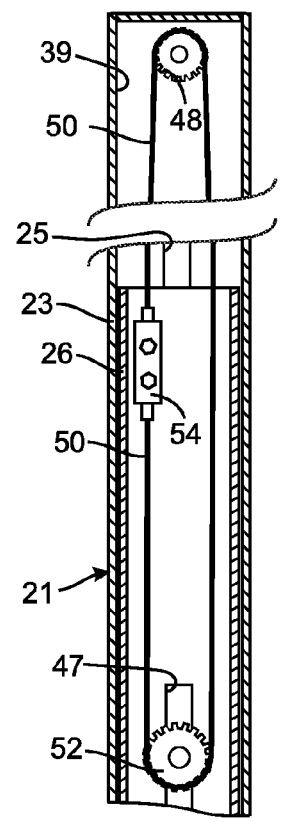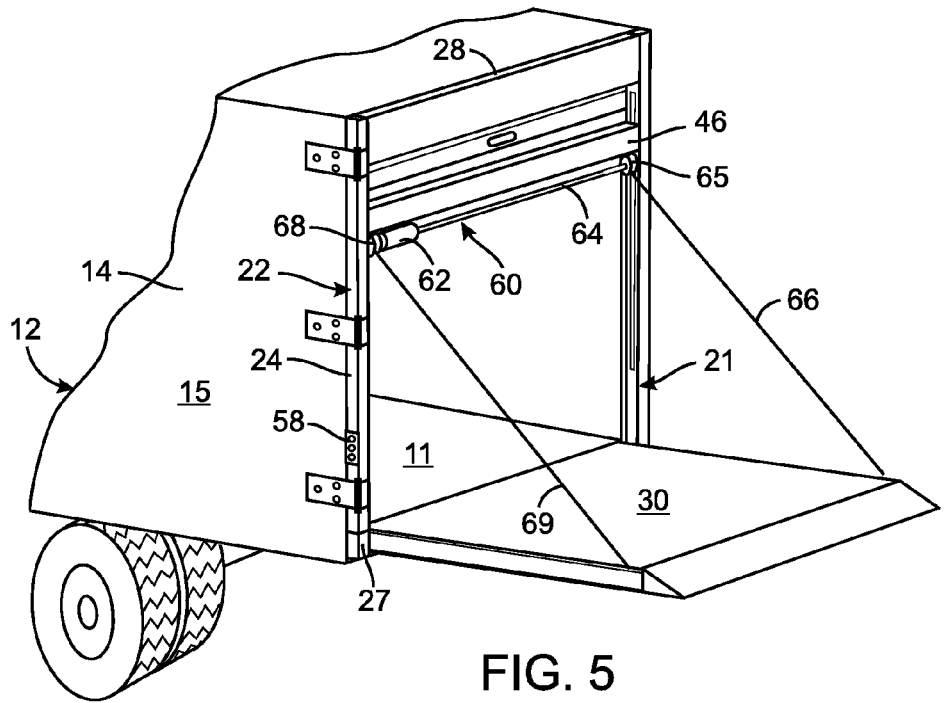

TELESCOPING CARGO LIFTING APPARATUS FOR A TRUCK

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to apparatus for loading and unloading a truck with cargo, and more particularly to such apparatus that is power operated and mounts on the truck.

2. Description of the Related Art

An over the highway truck commonly has a body with an enclosed box into which cargo being hauled by the vehicle is placed. A doorway is provided, typically at the rear of the box, through which the cargo is loaded and unloaded. The floor of the box is approximately four feet above the ground, therefore some businesses have loading docks that are raised above the ground to match the floor height of trucks.

However, many businesses such as restaurants and small retail stores do not have special loading docks. At these locations, the cargo must be raised into the truck box and lowered therefrom. A fork lift vehicle can be utilized for that purpose, however a fork lift is unavailable at many locations that do not have loading docks. Although ramps can be employed to transfer the cargo to and from the truck, ramps are not easy to use outdoors in bad weather conditions which make the ramp surface slippery.

Therefore, it is desirable to provide a different mechanism which is attached to the vehicle to load and unload cargo.

SUMMARY OF THE INVENTION

The present apparatus facilitates loading and unloading a truck with cargo. The apparatus includes a mounting frame for attaching to the truck adjacent to a doorway. The mounting frame comprises a vertical first telescoping guide, that in one embodiment has a first guide member with a channel and a first support member slideably received within the channel of the first guide member, and a vertical second telescoping guide, that in the one embodiment has a second guide member also with a channel and a second support member slideably received within the channel of the second guide member. A cargo carrying platform is pivotally attached to the first guide member and the second guide member, preferably near the lower ends of the guide members. A cross member may be secured to the first guide member and the second guide member, preferably near the upper ends of the guide members.

A power operated lift elevator is provided for extending and retracting the first and second telescoping guides. Extending and retracting the first and second telescoping guides lowers and raises the cargo carrying platform with respect to the truck. In the one embodiment, the lift elevator includes a lift motor secured to the first and second guide members, a first drive sprocket that is rotated by the lift motor, and a first chain affixed to the first support member and engaged by the first drive sprocket. That embodiment also has a second drive sprocket that is rotated by the lift motor, and a second chain affixed to the second support member and engaged by the second drive sprocket. As the lift motor rotates the first and second drive sprockets, the first and second chains are moved over those sprockets thereby extending or retracting the first and second telescoping guides depending on the direction of that rotation. As a result of that movement of the two telescoping guides, the cargo carrying platform is lowered or raised with respect to the truck.

The platform, for carrying the cargo, is coupled to the first and second first telescoping guides. A power operated platform elevator pivots the platform respect to the first and second telescoping guides. In one aspect of the present apparatus, the platform elevator employs an electrically powered winch.

In another aspect of the apparatus, the lift motor is an electric motor and the winch employs another electric motor.

BRIEF DESCRIPTION OF THE DRAWINGS

FIG. 2 is a partial cross sectional view of a portion of a vertical guide of the cargo lifting apparatus;

FIG. 3 is a longitudinal cross sectional view of the portion of the vertical guide taken along line 3-3 in FIG. 2;

FIG. 5 is a fragmented perspective view of the rear of the truck with the platform raised above the ground;

DETAILED DESCRIPTION OF THE INVENTION

Figure 1:
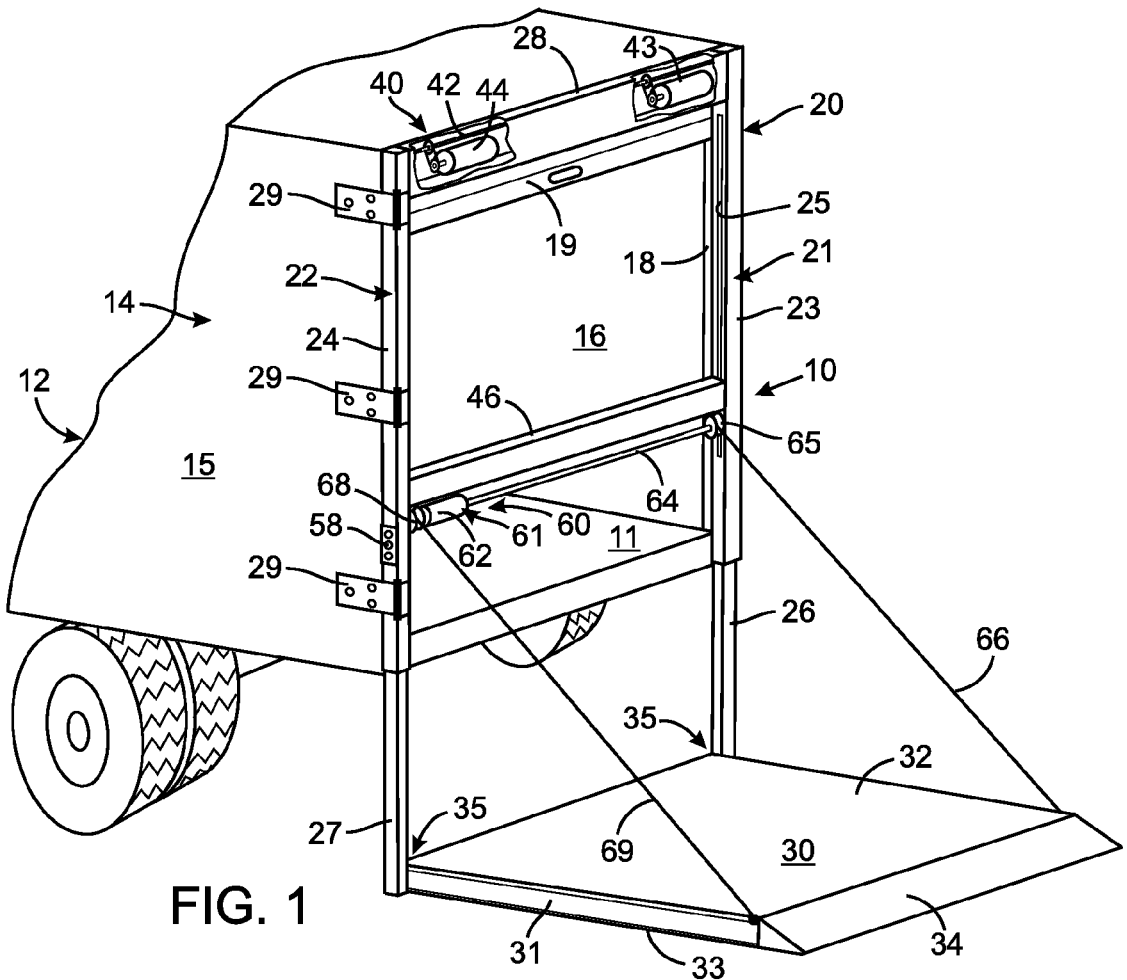
FIG. 1 is a fragmented perspective view of the rear of a truck on which an example of a cargo lifting apparatus according to the present invention has been installed.

References herein to directional relationships and movement, such as top and bottom, left and right, or up and down, refer to the relationship and movement of the components in the orientation illustrated in the drawings, which may not be the orientation of the components in a particular installation.

With initial reference to FIG. 1, a cargo lifting apparatus 10 is installed on a truck 12 which has a cargo box 14 with opposing side walls 15 and 16. A cargo bed 11 of the truck 12 is several feet above the surface of the ground on which the truck travels. Cargo is loaded into and unloaded from the cargo box through a rear doorway 18. A rear door 19 can be manually raised and lowered to open and close the rear doorway 18.

The cargo lifting apparatus 10 has a mounting frame 20 that supports a cargo carrying platform 30. The mounting frame 20 has vertical first and second telescoping guides 21 and 22 on opposite sides of the doorway 18. The vertical first telescoping guide 21 includes a first guide member 23 extending alongside the right side of the doorway 18. The first guide member 23 is formed of square or rectangular, tubular metal stock thereby providing an inner longitudinal channel within which a first support member 26 is slideably received. A vertical slot 25 extends longitudinally in the surface of the first guide member 23 that faces toward the doorway thereby exposing a portion of the inner first support member 26. The first support member 26, also formed of square or rectangular, tubular metal stock, that is slideably received within the first guide member 23. The vertical second telescoping guide 22 has a similar construction and includes a second guide member 24 extending alongside the left side of the doorway 18 with a second support member 27 slideably received therein. Instead of the first and second guide members 23 and 24 being formed by tubular metal stock, U-shaped cross sectional stock that defines a channel to receive the respective support member may be used. The upper ends of first and second guide members 23 and 24 are connected, such as by welding, to an upper frame member 28 that extends above the doorway 18 to form the inverted U-shaped mounting frame 20. The upper frame member 28 is hollow and encloses part of the lifting mechanism, as shown by the cutaway sections and as will be described.

The mounting frame 20 is affixed to the truck cargo box 14 by a plurality of hinges 29 attached to second telescoping guide 22 and the first side wall 15 on one side of the truck doorway 18. The mounting frame 20 also is secured to the cargo box 14 by a latch assembly (not visible in FIG. 1) that is attached to the exterior of the second side wall 16 and the first telescoping guide 21. The cargo lifting apparatus 10 can be removed from the truck, if needed, by releasing the latch assembly and decoupling the hinges 29.

A power operated lift elevator 40 enables the cargo platform 30 attached to the first and second telescoping guides 21 and 22 to be raised and lowered between the positions depicted in FIGS. 1 and 5. With reference to FIGS. 1, 2 and 3, the first and second support members 26 and 27 are extended downward from and retracted upward into the first and second guide members 23 and 24, respectively, in a telescoping manner by the lift elevator 40. The lift elevator 40 is power operated by first and second lift motors 43 and 44 that are mounted inside a upper frame member 28 that is attached to the first and second guide members 23 and 24. As used herein, the term "power operated" refers to an apparatus that is operated by electricity, hydraulic fluid, or pressurized air. A cross member 46 extends between the first and second guide members 23 and 24 and is attached through the guide member slots 25 to the upper end sections of the first and second support members 26 and 27, as shown in FIG. 2. As the first and second support members 26 and 27 slide vertically within the inner channels 39 defined in the first and second guide members 23 and 24, the cross member 46 also moves up and down.

FIGS. 2 and 3 show the details of the lift elevator 40 on the right side of the cargo lifting apparatus 10 with the understanding that the lift elevator has a similar construction on the left side for raising and lowering the second support member 27 within second guide member 24. The first lift motor 43 has a shaft that is connected by a motor transmission chain 45 or other type of transmission, such as a belt or gears, to a lift drive shaft 42 that extends across the width of the mounting frame 20. The second lift motor 44 is similarly coupled to the lift drive shaft 42. The lift drive shaft 42 projects into the inner channel 39 of first guide member 23. A first drive sprocket 48 is attached to the end of the lift drive shaft 42 that is inside the first guide member 23. A first chain 50 loops over the first drive sprocket 48 and loops around a first idler sprocket 52 that is rotationally mounted to the first guide member 23 through a vertical slot 47 in the first support member 26. The first idler sprocket 52 is mounted to the first guide member 23 below the lower end of the travel of the cross member 46 which is attached to the first support member 26. A first fastener 54 secures ends of the first chain 50 to the first support member 26.

When the first electric lift motor 43 rotates the first drive sprocket 48, the first chain 50 rotates clockwise or counter clockwise, depending upon the direction of the motor rotation. Because the first chain 50 is fixedly attached to the first support member 26, the rotation of the first chain 50 raises and lowers the first support member 26 in a telescoping manner with respect to the first guide member 23, thereby correspondingly moving the cross member 46 and the cargo platform 30 that are attached to first support member 26. An electrically releasable lock may be provided to prevent the chain from rotating when the lift motors 43 and 44 are de-energized and thus keep the support members 26 and the platform 30 from moving due to the weight of the cargo thereon.

The lift elevator 40 has an identical construction on the left side of the mounting frame for raising and lowering the second support member 27 with respect to the second guide member 24. That is, the lift elevator 40 further comprises the second electric lift motor 44, a second drive sprocket, a second chain, a second idler sprocket, and a second chain fastener. Alternatively, a single lift motor or more than two lift motors could be used to operate the lift elevator 40.

Figure 4:
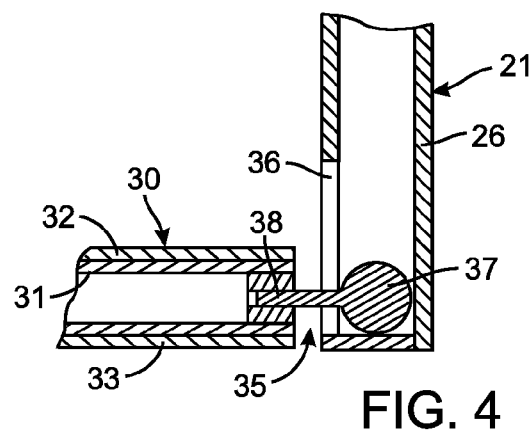
FIG. 4 is a fragmented longitudinal cross sectional view showing connection of a platform of the cargo lifting apparatus with a vertical guide member.

Referring again to FIG. 1, the cargo platform 30 has a rectangular platform frame 31 to which a flat metal top plate 32 is mounted to provide a surface on which to place the objects being moved onto and off the truck 12. A similar bottom plate 33 may extend across the lower side of the platform frame 31. A ramp 34 can be included to aid in moving objects between the cargo platform and the ground. The cargo platform 30 is pivotally connected to the lower ends of the first and second support members 26 and 27 by two coupling arrangements 35, the details for one of which are shown in FIG. 4. The first support member 26 is hollow and has a coupling slot 36 extending upward from its lower end and facing inward toward the cargo platform 30. The coupling arrangement 35 comprises a rod 38 with one end affixed to the cargo platform 30 and projecting through the coupling slot 36 into the first support member 26. The other end of the rod 38 that is within the first support member 26 is attached to a sphere 37. Thus the sphere 37 is received in the interior cavity of the first support member 26 in a manner in which the sphere can swivel in that cavity. The coupling slot 36 is wide enough to allow the rod 38 to slide and tilt freely therein, but is sufficiently narrow to captivate the sphere 37 inside the interior cavity. The cargo platform 30 is attached to the second support member 27 by a similar coupling arrangement 35. The two spherical coupling arrangements 35 allow the cargo platform 30 to tilt left to right and front to back with respect to the support member 26 and 27 and thus with respect to the back of the truck 12 to accommodate uneven surfaces when the cargo platform is lowered to the ground, as depicted in FIG. 1.

Figure 6:
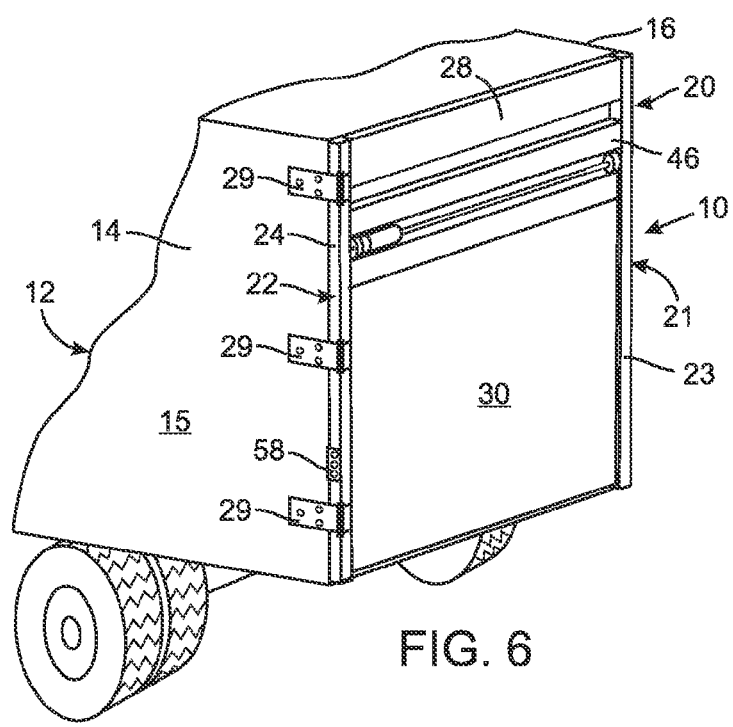
FIG. 6 is a fragmented perspective view of the rear of the truck with the platform pivoted against the rear door of the truck.

The pair of coupling arrangements 35 also allows the cargo platform 30 to pivot between a horizontal position depicted in FIG. 5 and a vertical position illustrated in FIG. 6 in which the cargo platform 30 is pivoted upward against the closed rear door 19 of the truck. The cargo platform 30 is placed in this vertical position when the truck 12 is driven on a road. The cargo platform 30 is pivoted with respect to the first and second support members 26 and 27 by a platform elevator 60 comprises an winch 61 mounted to the cross member 46 within the mounting frame 20. The winch 61 comprises an electric platform motor 62 that drives a reel shaft 64 to which first and second winch reels 65 and 68 are secured. The first winch reel 65 is located adjacent the first telescoping guide 21 and has the first platform tie 66 attached thereto. The second winch reel 68 is located adjacent the second telescoping guide 22 and has a second platform tie 69 connected to it. The distal ends of the first and second platform ties 66 and 69 are secured to the platform 30 adjacent the ramp 34. As used herein, the term "tie" refers to a rope, cable, wire rope, chain, belt, strap, or similar element that can be engaged by a reel, a pulley, or a sprocket to raise and lower a component, such as the support members 26 and 27. For example, the first and second platform ties 66 and 69 may be steel or polycarbon cables. When the platform motor 62 is energized, the platform ties 66 and 69 are wound onto or unwound from the two winch reels 65 and 68, depending upon the direction at which the platform motor rotates. This winding and unwinding of the platform ties 66 and 69 pivots the cargo platform 30 about the lower ends of the first and second support members 26 and 27 between the horizontal and vertical positions illustrated respectively in FIGS. 5 and 6.

The electrical system of the truck 12 provides power for operating the first and second lift motors 43 and 44 and the platform motor 62. A person controls the application of that power via a control panel 58 attached to the mounting frame 20. The control panel 58 has switches for independently operating the electric motors in different rotating directions. Alternatively, the hydraulic or pneumatic motors may be used in place of the electric motors. Furthermore, the platform elevator 60 may employ multiple motors. As used herein, a "motor" is a device that is powered by electricity, hydraulic fluid, or pressurized air and that rotates a machine component which is connected to the motor.

Figure 8:
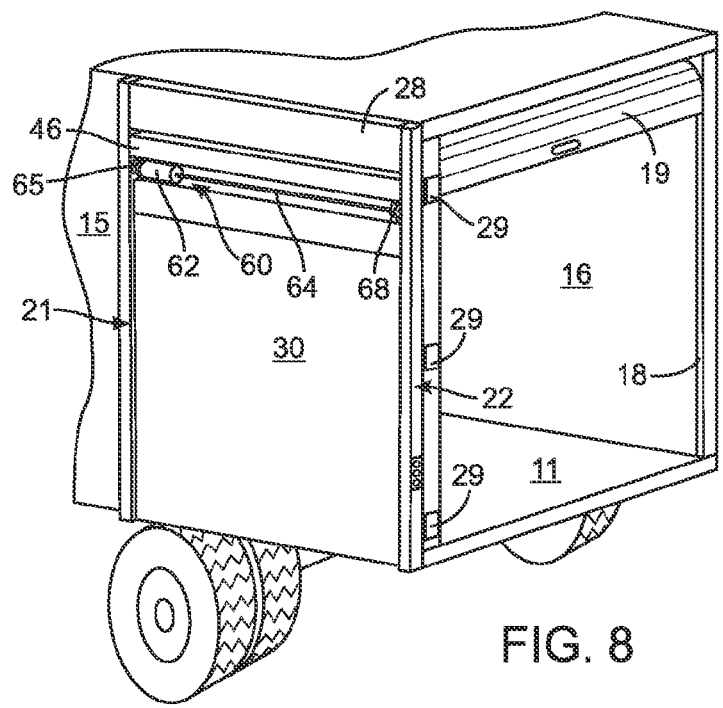
FIG. 8 is illustrates the cargo lifting apparatus swung against a side wall of the truck.

Referring again to FIG. 6, because the cargo lifting apparatus 10 is mounted to the truck 12 by hinges 29, that apparatus can swing away from the rear of the truck to a position against the side wall 15 of the truck as shown in FIG. 8. This enables the truck 12 to be backed against a conventional loading dock in order to directly transfer cargo between the truck cargo bed 11 and the loading dock through the doorway 18 without using the cargo lifting apparatus 10.

Figure 7:
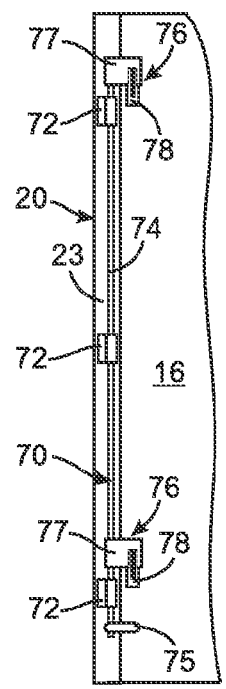
FIG. 7 illustrates a latch assembly that secures the cargo lifting apparatus to the rear of the truck.

To swing the cargo lifting apparatus 10 away from the doorway 18, a latch assembly 70, that attaches the mounting frame 20 to the second side wall 16 of the truck, has to be released. The details of the latch assembly 70 are illustrated in FIG. 7. Several brackets 72 are affixed to the outer side edge of the first guide member 23 of the mounting frame 20. The brackets 72 have circular tube portions through which a latch rod 74 is slideably and rotatably received. A handle 75 is provided at the lower end of the rod 74 so that a person can operate the latch assembly. The handle 75 enables the rod 74 to be moved vertically up and down and also to be rotated within the brackets 72. A pair of latches 76 couple the mounting frame 20 to the side wall 16 of the truck. Each latch 76 comprises a claw 77 secured to the rod 74 to move therewith. Each claw 77 engages a striker post 78 that is affixed to the exterior surface of the side wall 16. When the claws 77 are pivoted parallel to the side wall 16, they may be dropped downward to engage the striker post 78 and secure the mounting frame 20 across the rear of the truck. The cargo lifting apparatus 10 can be moved away from the rear of the truck 12 by the person first sliding the rod 74 and the attached claws 77 upward so that the claws clear the striker posts 78. This places each latch 76 in a released state.

In that released state of the latch assembly 70, a person can grasp the vertical first telescoping guide 21 and swing the mounting frame 20 about the hinges 29 away from the rear end of the truck. The mounting frame can be pivoted farther until resting against the outside of the truck's opposite first side wall 15, as shown in FIG. 8. Another set of striker posts can be affixed to the first side wall 15 to hold the cargo lifting apparatus 10 against that wall.

The reverse process is used to again secure the cargo lifting apparatus 10 across the truck doorway 18.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. An apparatus for loading and unloading a truck with cargo, wherein said truck has a doorway, said apparatus comprising:
   a cargo lifting apparatus;
   a mounting frame for attaching the cargo lifting apparatus to the truck adjacent to the doorway and comprising a first telescoping guide and a second telescoping guide;
   the cargo lifting apparatus including:
   a platform, for supporting the cargo, coupled to the first and second telescoping guides;
   a lift elevator having a first lift motor for extending and retracting the first and second telescoping guides, which thereby raises and lowers the platform with respect to the truck; and
   a platform elevator having a platform motor for pivoting the platform with respect to the first and second telescoping guides;
   the mounting frame attached to a first wall of the truck adjacent to the doorway using at least one hinge and attached to a second wall of the truck opposite the first wall using a releasable latch assembly;
   and the mounting frame configured to swing with the cargo lifting apparatus to a position away from the doorway of the truck when the releasable latch assembly is in a released state;
   Wherein the apparatus for loading and unloading a truck with cargo further comprises a cross member secured to an upper end of both the first telescoping guide and the second telescoping guide opposite the platform, wherein the platform elevator is mounted on the cross member.

2. The apparatus recited in claim 1 wherein:
   the first telescoping guide comprises a first guide member and a first support member slideably engaging the first guide member; and
   the second telescoping guide comprises a second guide member and a second support member slideably engaging the second guide member.

3. The apparatus recited in claim 2 wherein the platform is pivotally attached to the first support member and to the second support member.

4. The apparatus recited in claim 2 wherein a one of the platform and the first support member has a first sphere affixed thereto and another one of the platform and the first support member moveably engages the first sphere; and one of the platform and the second support member has a second sphere affixed thereto and another one of the platform and the second support member moveably engages the second sphere.

5. The apparatus recited in claim 2 wherein lift elevator further comprises a first drive element affixed to the first support member and operatively coupled to be moved by the first lift motor and thereby move the first support member with respect to the first guide member, and the lift elevator further comprises a second drive element affixed to the second support member and operatively coupled to be moved by the first lift motor and thereby move the second support member with respect to the second guide member.

6. The apparatus recited in claim 1 wherein lift elevator further comprises a first drive sprocket operatively coupled for rotation by the first lift motor, and a first chain affixed to the first support member and engaged by the first drive sprocket, and the lift elevator further comprises a second drive sprocket operatively coupled for rotation by the first lift motor, and a second chain affixed to the second support member and engaged by the second drive sprocket.

7. The apparatus recited in claim 1 wherein the first lift motor and the platform motor are electric motors.

8. The apparatus recited in claim 1 wherein the mounting frame further comprises a frame member above the doorway and affixed to the first telescoping guide and the second telescoping guide, wherein the first lift motor is mounted to the frame member.

9. The apparatus recited in claim 1 wherein platform elevator comprises a winch that includes the platform motor, a first reel operatively connected for rotation by the platform motor, and a first tie extending from the first reel to the platform.

10. The apparatus recited in claim 9 wherein platform elevator further comprises a second reel operatively connected for rotation by the platform motor, and a second tie extending from the second reel to the platform.

11. An apparatus for loading and unloading a truck with cargo, wherein said truck has a doorway, said apparatus comprising:
  a cargo lifting apparatus;
  a mounting frame for attaching the cargo lifting apparatus to the truck adjacent to the doorway and comprising a first guide member forming a first channel, a first support member slideably received within the first channel, a second guide member forming a second channel, and a second support member slideably received within the second channel;
  the cargo lifting apparatus including:
  a platform for supporting the cargo and pivotally coupled to the first support member and the second support member;
  an electrically powered lift elevator for sliding the first support member within the first channel of the first guide member and for sliding the second support member within the second channel of the second guide member;
  an electrically powered platform elevator for pivoting the platform with respect to the first support member and the second first support member;
  the mounting frame attached to a first wall of the truck adjacent to the doorway using one or more hinges and attached to a second wall of the truck opposite the first side wall using a releasable latch assembly;
  and the mounting frame configured to swing with the cargo lifting apparatus to a position away from the doorway of the truck when the releasable latch assembly is in a released state;
  a cross member secured to an upper end of both the first support member, and
  the second support member opposite the platform, wherein the cross member is raised and lowered in unison with the platform,
  wherein the platform elevator is mounted on the cross member.

12. The apparatus recited in claim 11 wherein one of the platform and the first support member has a first sphere affixed thereto and another one of the platform and the first support member moveably engages the first sphere; and one of the platform and the second support member has a second sphere affixed thereto and another one of the platform and the second support member moveably engages the second sphere.

13. The apparatus recited in claim 11 wherein the platform is pivotally attached adjacent to a first end of the first support member and adjacent to a second end of the second support member.

14. The apparatus recited in claim 11 wherein the lift elevator comprises a lift motor secured to the mounting frame, a first drive element affixed to the first support member and operatively coupled to be moved by the lift motor and thereby move the first support member with respect to the first guide member, and a second drive element affixed to the second support member and operatively coupled to be moved by the lift motor and thereby move the second support member with respect to the second guide member.

15. The apparatus recited in claim 11 wherein the lift elevator comprises a lift motor secured to the mounting frame, a first drive sprocket operatively coupled for rotation by the lift motor, and a first chain affixed to the first support member and engaged by the first drive sprocket, and the lift elevator further comprises a second drive sprocket operatively coupled for rotation by the first lift motor, and a second chain affixed to the support guide member and engaged by the second drive sprocket.

16. The apparatus recited in claim 11 wherein platform elevator comprises a winch that has a motor, a first reel rotatable by the motor, and a first tie extending from the first reel to the platform.

17. The apparatus recited in claim 16 wherein the winch is mounted on a cross shaft that is secured to the first support member and to the second support member.

18. The apparatus recited in claim 11 wherein the mounting frame further comprises a frame member that is affixed to the first guide member and the second guide member.

\* \* \* \* \*